United States Patent [19]

Schneider

[11] 4,301,426

[45] Nov. 17, 1981

[54] SOLID STATE LASER AND MATERIAL

[75] Inventor: Irwin Schneider, Alexandria, Va.

[73] Assignee: The United States of America as represented by the Secretary of the Navy, Washington, D.C.

[21] Appl. No.: 95,683

[22] Filed: Nov. 19, 1979

[51] Int. Cl.³ .............................................. H01S 3/14
[52] U.S. Cl. ................................................ 331/94.5 F
[58] Field of Search ................................... 331/94.5 F

[56]  References Cited
PUBLICATIONS

"Broadly Tunable Lasers Using Color Centers", by Mollenauer et al., *Jour. App. Phys.*, vol. 46, No. 7, Jul. '75.
"Broadly Tunable Laser Using Color Centers", by Mollenauer, *Proc. of the 2nd Int. Conf. on Laser Spectros*, (23–27 Jun. '75), pp. 227–238.
"Tunable CW Laser Operation in $F_B(11)$ Type Color Center Crystals", by Litfin et al., *App. Phys. Lett.*, vol. 31, No. 6, (Sep. '77).
"A Broadly Tunable CW Laser Using Color Centers", by Mollenauer et al., *App. Phys. Lett.*, vol. 24, No. 8, Apr. '74.

*Primary Examiner*—William L. Sikes
*Assistant Examiner*—Leon Scott, Jr.
*Attorney, Agent, or Firm*—R. S. Sciascia; A. L. Branning; T. E. McDonnell

[57]  ABSTRACT

Broadly tunable, c.w. laser action in the ir(infrared) spectral region is obtained from $(F_2{}^+)_A$ color centers in an alkali halide crystal having $F_A$, $F_B$, $F_A'$, $F_B'$ $(F_2)_A$ and $(F_2{}^+)_A$ color centers in a dynamic equilibrium. The laser material is prepared by additively coloring an alkali halide crystal, exposing the colored crystal to light in the high-energy edge (i.e., between 450–300 nm) of the F-center absorption range at a temperature from about 253K to about 300K, cooling the crystal to a temperature not greater than 100K, and re-exposing the crystal to the same light to create a dynamic equilibrium state in which $(F_2{}^+)_A$ centers are present.

15 Claims, 4 Drawing Figures

SOLID STATE LASER AND MATERIAL

BACKGROUND OF THE INVENTION

The present invention pertains generally to solid-state lasers and particularly to tunable color-center lasers (C.C.L.).

In order for a material to be suitable as a continuously tunable solid-state laser, its optical transitions should be homogeneously broadened in both absorption and emission, thus implying a strong electron-phonon coupling of the centers to the lattice. Preferably, the material should have or nearly have a 4-energy level configuration, the four levels consisting of a relaxed ground state, an unrelaxed excited state which is reached through pumping the homogeneously broadened absorption of the center, a relaxed excited state which is thereafter reached by a very rapid ($\sim 10^{-13}$ sec) nonradiative transition from the unrelaxed excited state, and an unrelaxed ground state which is reached by a radiative transition ($\sim 10^{-8}$ sec) from the relaxed excited state. Finally, the transition from the unrelaxed ground state back to the initial relaxed ground state is very rapid ($\sim 10^{-13}$ sec) and nonradiative. The unrelaxed ground state should be at an energy E above the relaxed ground state sufficient to ensure that it not be thermally populated from the ground state, i.e., $E >> RT$. Furthermore, because of its relatively short lifetime, the unrelaxed ground state would thus be virtually depleted, thereby assuring a population inversion and a low threshold optical pump power. Besides homogeneous broadening and low threshold characteristics, to be most useful as a tunable laser, a material should be easily and inexpensively prepared, have a reasonably high pump efficiency, lase in a desirable wavelength range, and be stable and nonvolatile. An important property, which some color center laser materials do not have is the capability of lasing after periods of storage at room temperature.

Particularly useful ranges of laser tunability are the infrared and near infrared spectral regions, which are important for selecting the specific wavelength of minimum loss for fiber-optic communications, for the molecular spectroscopic analysis of many of the primary and secondary vibrational modes of a wide variety of organic and inorganic molecules, for pollutant detection, and for semiconductor spectroscopic analysis. At present, few acceptable tunable lasers exist for the infrared and near-infrared regions. Organic dyes are moderately effective in the visible region, but fail completely for wavelengths greater than about one micron. Parametric oscillators are useful but are expensive, cumbersome, and often low-powered. The most promising materials for tunable lasing beyond one micron are alkali halides containing homogeneously broadened color centers.

A number of tunable color-center lasers have been reported, e.g., (1) U.S. Pat. No. 3,970,960 issued on July 20, 1976 to Linn F. Mollenauer, (2) B. Fritz et al *Laser Effect in KCl with $F_A$ (Li) Centers*, in Solid State Communications, 3(3): pp. 61-68 1965, and (3) *A Primer on F-center Lasers*, in Electro-Optical Systems Design pp. 26-29, September 1978. The color centers which have been made to lase in these systems are the $F_A$ (II) center in several host crystals such as KCl and RbCl, and $F_B$(II) center in KCl and the $F_2^+$ center in KCl, NaCl, and KF. The $F_A$(II) and the $F_B$(II) centers, useful, are limited to wavelengths between 2.2 and 3.0 microns and have a maximum output power of about 50 mw. Furthermore, it is necessary to use three different crystals in order to cover this spectral range. The $F_2^+$ center in the presently used crystals, e.g., KCl and KF, can produce several watts of power very efficiently, but is created in an impractical manner which requires that the crystal first be irradiated with 2 MeV electrons at 77° K., annealed to room temperature or below, and then cooled back to 77° K. The crystal must then remain indefinently at 77° K. in order to retain its color centers and lasing capability. Unfortunately, crystals containing $F_2^+$ centers produced in this manner exhibit a long-term optical fatigue that causes the laser capability of the material to disappear. These crystals then require an impractical continued reprocessing with a 1 to 2 MeV-electron accelerator.

SUMMARY OF THE INVENTION

It is, therefore, an object of the present invention to prepare a new color-center laser material with a broad range of tunability.

A further object of the present invention is to provide a fabrication technique which results in a substantial decrease in the volatility and fatigue of $F_2^+$-type color-center lasers.

A still further object of this invention is to produce a color-center laser with potentially a relatively high cw intensity and broad tunability.

Another object of the invention is to prepare a color-center laser material which can be stored at room temperature without diminishing the lasing capability of the material.

These and other objects are achieved from an isotropic crystal comprising primarily $(F_2^+)_A$, $(F_2)_A$, $F_A$, $F_A'$, $F_B$, and $F_B'$ color centers in dynamic equilibrium, whereby electrons lost by $(F_2)_A$ centers in forming $(F_2^+)_A$ centers are trapped by the $F_A$ and $F_B$ centers to form $F'_A$ and $F'_B$ centers with noninterferring near infrared absorption bands. The doped crystal is prepared by additive coloring so that it initially contains at least $7 \times 10^{17}$ F-centers/cc uniformly dispersed throughout the crystal; exposing the crystal at a temperature from about 253° K. to about 300° K. to light in the high-energy shoulder of the F band thereby converting F centers to $F_A$, $F_B$, $F_2$ and $(F_2)_A$ centers; and exposing the crystal to light in the high-energy shoulder of the F-band at a temperature of 100K or below, thereby randomly converting $F_2$ centers to $(F_2)_A$ through repeated reorientation processes while creating a dynamic equilibrium which forms $(F_2^+)_A$ centers from $(F_2)_A$ centers.

DETAILED DESCRIPTION OF THE INVENTION

The laser medium according to the practice of the invention is an isotropic alkali halide capable of absorbing light anisotropically in which the alkali ions is in general either a lithium, potassium, or rubidium ion and the halide ion is a fluoride, chloride, bromide, or iodide ion. Certain extreme combinations such as rubidium fluoride would be of limited usefulness. It is also often possible to substitute alkaline earth ions, i.e. calcium, strontium, and barium, for alkali metal ions.

Figure 1:
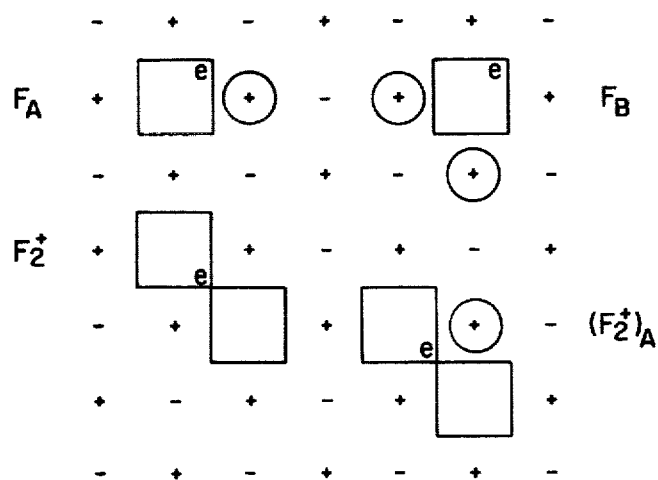
FIG. 1 is a schematic comparison of the $(F_2^+)_A$ center with three other laser active centers.

During growth, the crystal is doped with an impurity cation in order for it to eventually contain ionic and electronic combinations of proper structure. The impurity cations are usually chosen so that they are smaller than the host-crystal cations, e.g., potassium fluoride would be doped with either sodium or lithium. The color center used in the invention to produce broadly tunable lasing is the $(F_2^+)_A$ center shown in FIG. 1. Also shown are the $F_A$, $F_B$ and $F_2^+$ centers. In FIG. 1, circles and squares represent impurity ions and vacancies, respectively. The $(F_2^+)_A$ and $F_2^+$ centers are oriented along $<011>$ directions. The $(F_2^+)_A$ center is simply in a singly ionized $(F_2)_A$ center, i.e., it consists of one electron trapped by two neighboring anion vacancies along a $<110>$ direction, all being adjacent to a substitution cation impurity. Three other color centers important for the laser material of the present invention are shown in FIG. 1. The $F_A$ center consists of one electron trapped in an anion vacancy adjacent to a substitutional cation impurity ion, i.e., an F center next to a cation impurity. The $F_B$ center consists of an F center adjacent to two cation impurities in the configuration shown in FIG. 1. The $F_2^+$ center is an electron trapped by two anion vacancies, i.e., a singly ionized pair of neighboring F centers along a $<110>$ direction. As illustrated in FIG. 1, the $(F_2^+)_A$ center consists of an $F_2^+$ center next to a cation impurity.

An important property of the $(F_2^+)_A$ center which permits the centers to be properly oriented with respect to the polarization of the laser cavity is optical alignability along a specific $<011>$ crystallographic axis. This is possible since the center realigns when it absorbs light in certain of its optical transitions and each of these transitions possesses an optical dipole moment lying either parallel or perpendicular to that $<011>$ axis. Reorientation is generally induced through absorption either directly with light in the visible spectrum or through multiple phonon excitation involving infrared transitions. If the electric-field vector of the incident light within the spectral range of the color center band has a component in the direction of the dipole moment, then the light is absorbed at a rate proportional to $\cos^2\theta$, where $\theta$ is the angle between the dipole moment of the absorption and the electric field vector. Prolonged excitation with linearly polarized light continues to reorient centers until all lie along the crystallographic direction (or directions) which is perpendicular to the polarization of the light.

Figure 2:
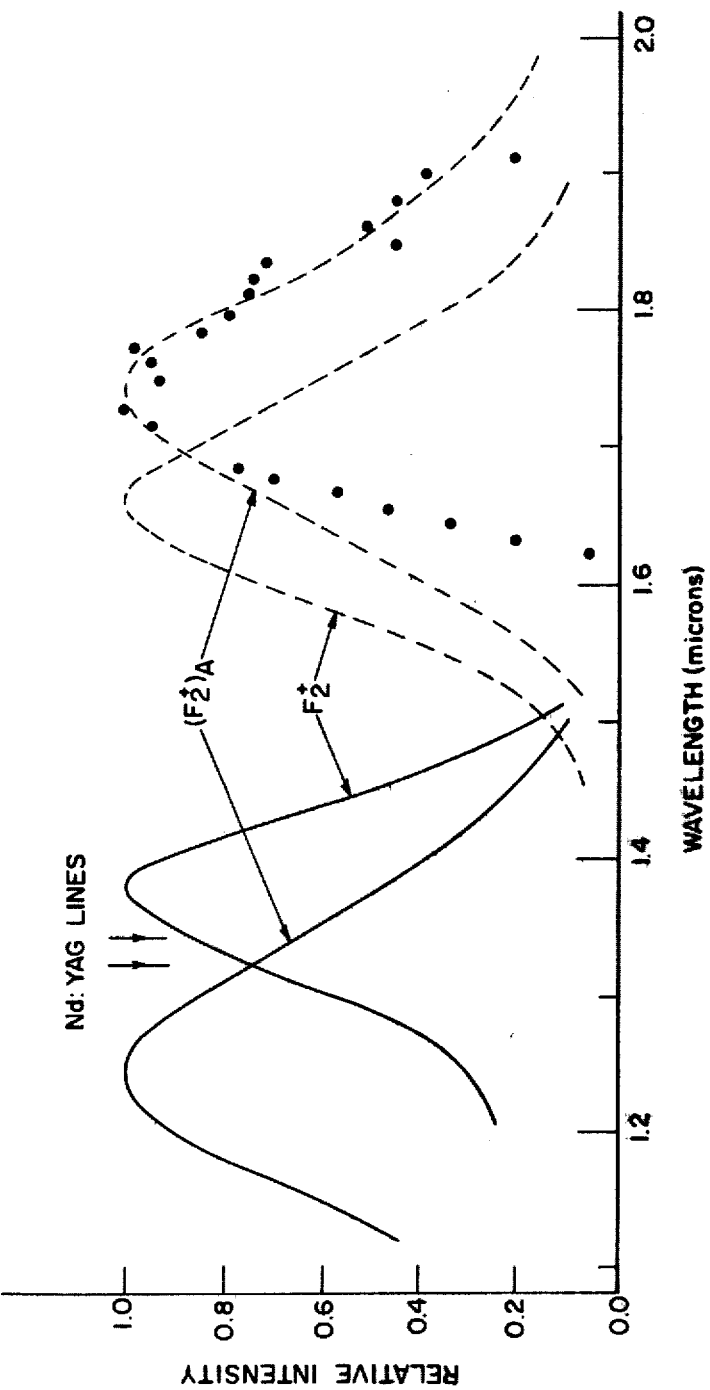
FIG. 2 compares the infrared absorption and luminescence bands of the $(F_2^+)_A$ and $(F_2^+)$ centers in potassium chloride at 77° K.

The absorption and emission properties of the $(F_2^+)_A$ center when compared to those of the $F_2^+$ strongly indicate that they have comparably high oscillator strengths and quantum efficiencies. FIG. 2 shows that the $(F_2^+)_A$ center absorption and emission bands in KCl peak at 1.24 and 1.74 microns, respectively. This compares to 1.38 and 1.65 microns for the corresponding values of the $F_2^+$ center. Data similar to this, i.e., measured at 4K instead of 77K was first reported by Schneider, I. in Phys. Rev. Letter 42: page 213-4, July 15, 1965 for $F_2^+$ centers and Schneider, I. in Sol. St. Comm. 9: 45-7, 1971 for $(F_2^+)_A$ centers.

Although the above data indicates that an $(F_2^+)_A$ center could have lasing properties which are at least as attractive as those of the $(F_2^+)$ centers, no one has ever succeeded in making this center lase. The $(F_2^+)_A$ centers created at 4K in the prior study were generated by the use of x-rays and uv-excitation. Although the conversion ratio of $(F_2)_A$ centers to $(F_2^+)_A$ is relatively large, a major disadvantage of this technique is that it requires the crystal to be kept at this low temperature in order to maintain the $(F_2^+)_A$ center population. In contrast, the lasing crystal of the present invention has $F_A'$ and $F_B'$ centers thereby creating a dynamic equilibrium shown as follows:

$$(F_2)_A \Longleftrightarrow (F_2^+)_A + e^-$$

$$F_A + e^- \Longleftrightarrow F_A'$$

$$F_B + e^- \Longleftrightarrow F_B'$$

Consequently the lasing crystal of the present invention need only be maintained at a temperature at or below about 100K during lasing and does not lose its lasing capability after storage at room temperature.

The crystals of the present invention can be grown by any method which assures optical quality. The preferred method is the Kyropoulis technique, wherein from 0.75 to 1.5 mole percent of a salt impurity is added. For example, this amount of sodium chloride would be added to the KCl melt in order to obtain the alkali ions eventually needed to form $(F_2^+)_A$ centers. If the host crystal is an alkali fluoride, the crystal is prepared by the method disclosed in U.S. Pat. No. 4,087,374 issued on May 2, 1978 to I. Schneider et al. To date this technique is the only method known which permits additive coloration of alkali fluoride crystals.

Laser crystals are most conveniently used in the form of platelets, i.e., two of the dimensions are large in comparison with the third. Since a high initial F-center concentration is used, viz., in excess of $7 \times 10^7$ centers per cubic centimeter, the crystal platelet is preferably prepared by the following method. Crystals are first cleaved from the Boule to a thickness from 10 to 30 percent greater than needed for the laser cavity. For use in a three-mirror astigmatically compensated cavity that is generally used for continuous wave (cw) pumping, a final crystal thickness depends on cavity folding angle and crystal index of refraction and typically is around 1.7 mm. The relationship between these parameters for cavities of this type is described by H. W. Kogelnik et al. IEEE J. Quantum Electron, QE-8, 374 (1972). Both sides of this crystal are rough-polished and wrapped in foil such as stainless steel, nickel, or platinum in order to minimize or eliminate crystal strain caused by nonuniform temperature gradients arising during the coloring and quenching procedures.

The crystal is additively colored to produce F centers by placing the wrapped crystal along with a suitable alkali metal in a stainless steel tube or similar high-strength, high-temperature noncorrosive container weld-sealed at one end. The container is evacuated, back-filled with dry nitrogen gas, and quickly weld-sealed at the other end taking care that the alkali metal and crystals remain cool during the welding operation. The tube is annealed for several hours at a temperature ranging from about 100° to 150° C. below the crystal melting point. The tube is then quenched to room temperature. Quenching is essential to prevent or greatly reduce colloid formation in heavily-doped, heavily colored crystals and it leaves the crystal with F-centers in a well-dispersed state. Colloids are to be avoided since they can lead to unacceptably high levels of scattering loss at the emission wavelengths. Other additive coloring techniques may be used as long as the F-center concentration is at least $7 \times 10^{17}$ centers/c.c., dispersion of centers is uniform, and colloid formation is minimized or avoided.

The crystal is removed from the stainless steel tube in either total darkness or using a very dim red safety light. Each crystal surface is repolished briefly again in darkness using a fine crystal polishing compound, e.g., Linde A. The crystal is finally stirred from 5 to 15 seconds in concentrated hydrochloric acid, rinsed in ethyl or isopropyl alcohol, and dried by either blowing dry air across the surfaces or by drawing the wet surfaces across a dry polishing cloth. This treatment ensures high-quality surfaces exhibiting a minimal scattering loss.

A crystal prepared by the above method is now ready for mounting in a laser cavity and for the generation of $(F_2^+)_A$ centers in the crystal. The additively colored crystal contains primarily F-centers in very high concentrations ($2 \times 10^{18}$ centers/c.c or is about a factor of three larger than the minimum required. The $F_2$ and $(F_2)_A$ centers along with the $F_A$ and $F_B$ centers shown in FIG. 1 are generated in the crystal from F centers by illuminating the crystal with light absorbed by F centers at a temperature from 253K to 300K and preferably from 292 to 297K. Generally, this light lies in the green, blue, or near ultraviolet spectral regions. To achieve a reasonably uniform optical penetration of the heavily colored crystal, it is desirable to use light absorbed in the high-energy portion of the F-absorption band, i.e., at wavelength shorter than the wavelength at peak absorption. For example, in potassium chloride this light would lie at around 300–400 nm with a convenient source being the 365 nm mercury line. Potassium fluoride and sodium fluoride would be irradiated with light in the spectral region between 250–300 nm. Preferably, the crystal temperature during irradiation would be near room temperature and would last for a period of time sufficient to maximize the concentration of $F_2$ and $(F_2)_A$ centers, but not long enough to produce more complicated F-aggregate centers, such as the $F_3$ and $F_4$ centers. The usual irradiation time using a mercury source and monochromatic arrangement is from about 1.5 to about 6 minutes in KCl. Next the crystal is cooled to 100K or lower preferably between 50 and 90K and re-illuminated with the same excitation to convert $F_2$ centers to $(F_2)_A$. This process involves a random diffusion of the centers through the lattice via reorientation until the $F_2$ centers become trapped next to cation impurities. Of key importance is the fact that this same excitation at 77K also results in a dynamic equilibrium concentration of $(F_2^+)_A$ centers while forming $F_A'$ and $F_B'$ centers. The advantage of using the latter as electron traps, particularly in KCl, is that the $F_A'$ and $F_B'$ absorption bands are relatively narrow compared to the F' absorption, do not overlay the $(F_2^+)_A$ band and thus do not absorb the pump excitation. Hence, $(F_2^+)_A$ center bleaching is avoided through an electron-transfer mechanism. In general, the larger the proportion of the concentration of $F_A$ and $F_B$ center is to that of F centers, the more stable are the resulting $(F_2^+)_A$ centers. $(F_2^+)_A$ centers can be made to lase in a pulsed or a CW mode by any of a number of standard techniques. Basically, the crystal is placed in an optical cavity capable of resonating at the flourescence bands of the $(F_2^+)_A$ color centers and is exposed to infrared light absorbed in the $(F_2^+)_A$ band. At the same time, a dynamic equilibrium among the various centers in the laser material of this invention is insured by illuminating the crystal with light absorbed in the F-band spectral region.

An example of a cavity design and method for lasing a color center material in the CW mode is described by H. W. Kogelnik, et al. in J. Quantum Electronics, QE-8: p. 374 (1972) and in U.S. Pat. No. 3,970,960 issued on July 20, 1977 to L. F. Mollenouer. Briefly, the technique comprises locating the crystal at the beam waist of a three-mirror, astigmatically compensated configuration, while orienting the broad plane of the crystal at Brewster's angle to minimize transmission losses. Laser turnability is easily achieved by any of a number of conventional techniques including having a Littrow mounted diffraction grating as both the tuning element and output coupler. The grating reflects back most of the light in the first order while sending the remainder out of the cavity in zeroth order. In addition, the crystal is usually oriented so that a <110> crystallographic direction of the crystal lies in the plane formed by the folding laser pump path.

To better demonstrate the practice of the present invention the following example is given. It is understood that this example is given by way of illustration and is not meant to limit the disclosure or the claims to follow in any manner.

EXAMPLE I

About 150 grams of potassium chloride along with 1.25 mole percent of NaCl were melted and recrystallized into a single crystal using the Kryopolus method. Crystals (approximately 1 cm $\times$ 1 cm $\times$ 1.8 cm) were cleaved from the resulting Boule, wrapped in nickel foil (0.007 cm thick), and placed inside a stainless steel tube along with about 20 grams of potassium metal. The tube (about 7.5 cm long) was evacuated, back filled with one atmosphere of dry nitrogen and sealed by welding. It was then annealed for two hours in its entirety at 605° C., and quickly quenched to room temperature by total submersion in cold water. The crystal was then removed from the tube and stored. Prior to use, the crystal was rewrapped in nickel foil, annealed at 605° C. for six minutes and quenched to room temperature in order to eliminate colloid formation and to ensure a uniform dispersion of F centers. It was then repolished briefly with Lined A polishing compound, rinsed twelve seconds in concentration HCl, rinsed in isopropal alcohol and dried on a polishing cloth. This was done mostly in total darkness with only a brief exposure to a weak safety light.

Conversion of the F centers to $F_2$ and $(F_2^+)_A$ was next carried out in a laser cavity by exposing the crystal for three minutes to 365 nm light from a focused 200 watt mercury arc source. The light was filtered through a 7-54 Corning filter and a 11.5 cm long distilled water cell. The crystal was mounted on the cold finger of an optical dewar located at the beam waist of a three mirror astigmatically compensated cw cavity. The cavity was evacuated by a standard pumping system and maintained at low pressure with a molecular pump if using liquid-nitrogen cooled Zeolite. The crystal was then cooled and maintained at 77K.

Figure 3:
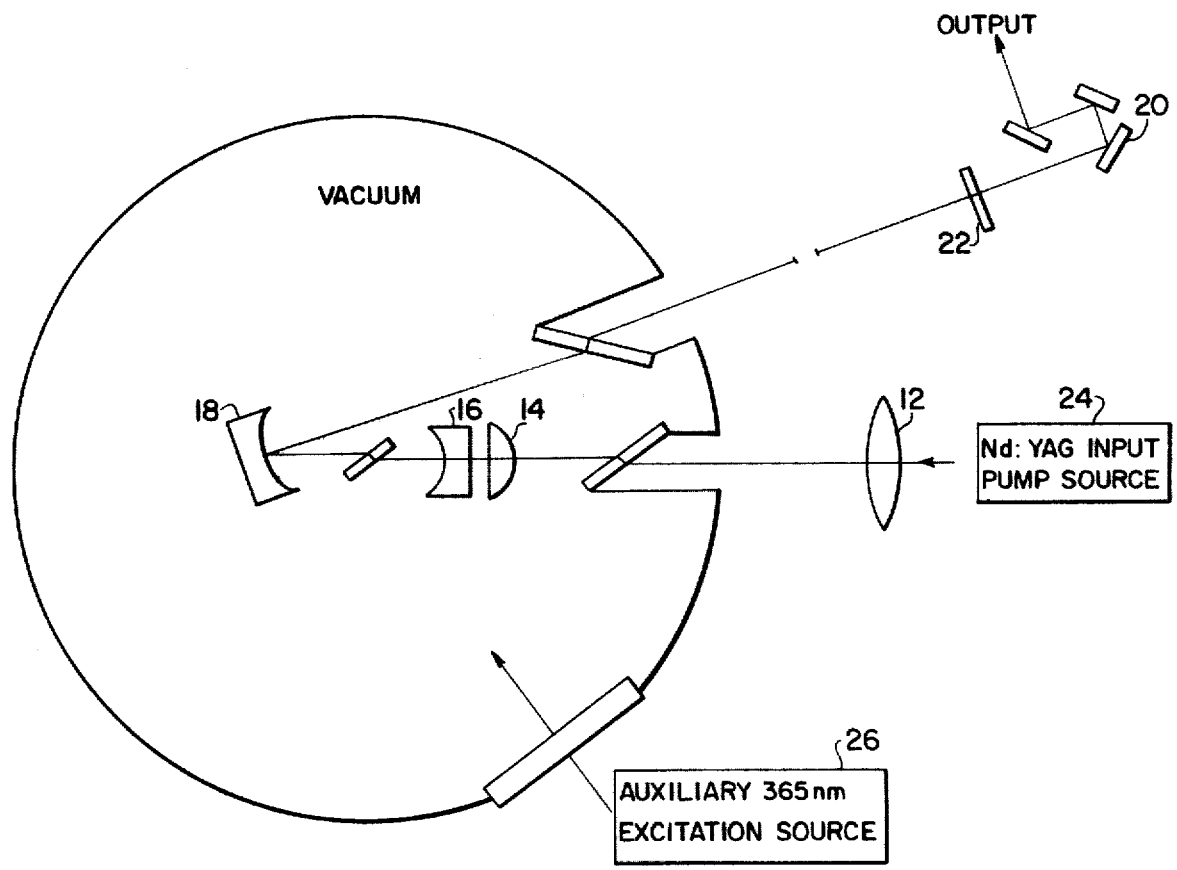
FIG. 3 is a schematic representation of the laser arrangement used to obtain laser action in a potassium chloride crystal containing $(F_2^+)_A$ centers.
Figure 4:
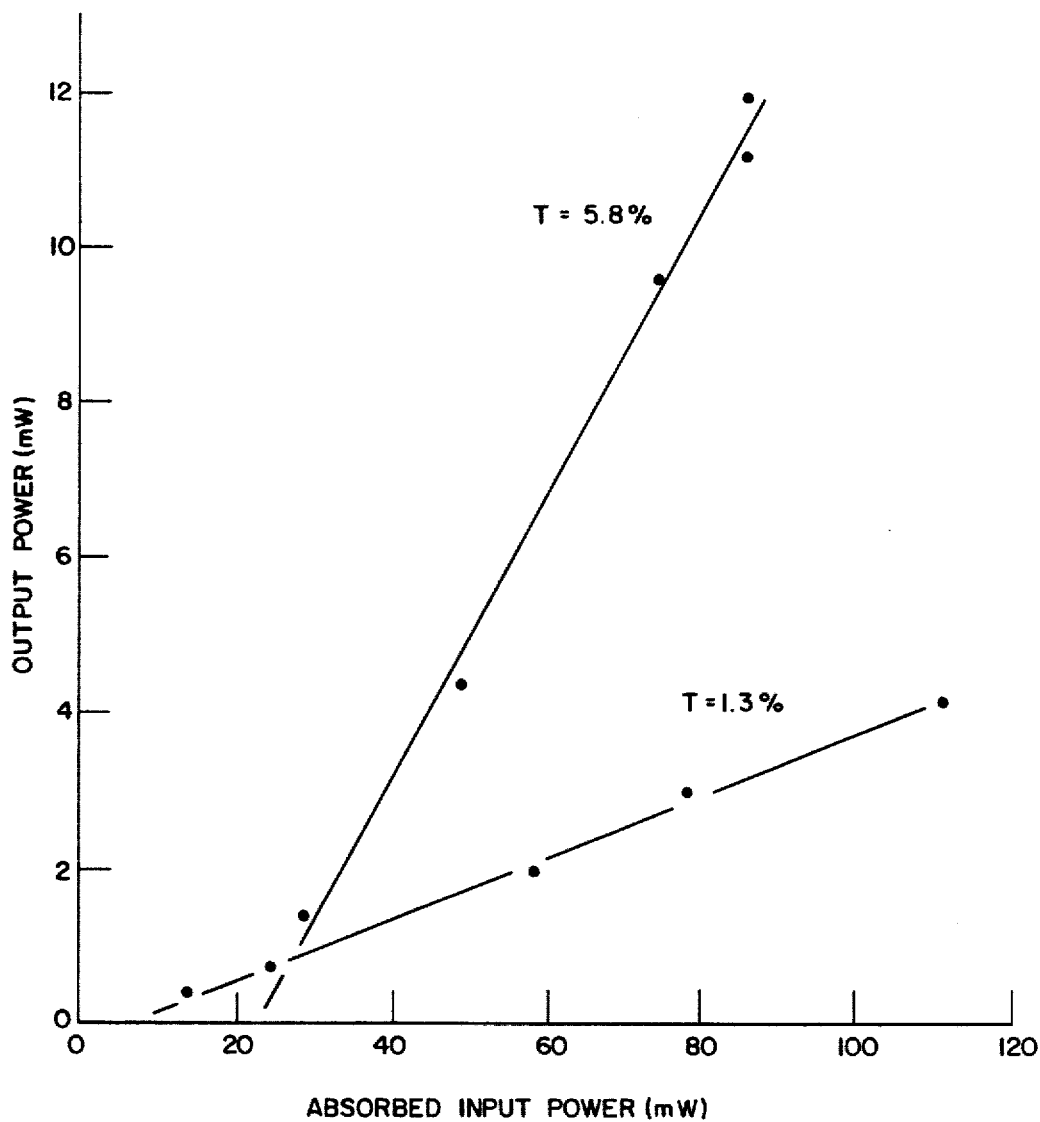
FIG. 4 is a graphic representation of threshold and output power measurements of lasing from a potassium chloride crystal with $(F_2^+)_A$ centers using two different output reflectors.

The laser apparatus and technique used to lase the crystal is described with reference to FIG. 3. The crystal 10 is pumped co-axially using a 30 cm focal length steering lens 12, a 25 mm focal length input lens 14, the latter being located a few millimeters in front of a 25 mm radius 11 mm thick dielectrically coated mirror 16. The mirror reflected more than 99% of all light between 1.6 and 2.1 microns and transmitted greater than 80% of all light between 1.30 and 1.35 microns. The remaining components arranged in a three-mirror, astigmatically compensated cavity were a 50 millimeter radius folding mirror 18 located about 50 mm from the input mirror, a 20° folding angle and an 95% reflecting grating 20 located approximately 400 mm from the folding mirror. An 80% dichroic mirror 22 was placed in front of this grating to assist in tuning to increase the overall reflectivity and to increase output power. A second mirror (not shown in FIG. 3) which reflects the pump beam and is placed behind these mirrors can increase the output power by roughly a factor of two when the C.C.L. was operated well above threshold. Power measurements were made using a flat reflector with a transmission of 5.8% and one with 1.3% transmission. The pump source 24 consisted of 1.32 and 1.34 micrometer lines of about equal intensity of a Nd:YAG laser with about 450 mw cw power incident on the crystal. The crystal was simultaneously exposed at normal incidence to light from the same aforementioned filtered, super-pressure mercury source. Light from this auxiliary 365 nm excitation source 26 was used to maintain the equilibrium population of properly oriented $(F_2^+)_A$ centers. The crystal absorbed about 20% of the incident pump power in a single pass and had a slope efficiency of 18% for absorbed power using an output reflector of 5.8%. As shown in FIG. 4, the slope efficiency dropped to 4% to the T=1.3% reflector with a threshold efficiency of just under 10 mw. Additional improvement in absorption could be obtained with a thicker crystal and consequently larger cavity folding angles or with a more heavily colored crystal. Using the grating as an output element, the range of tunability was observed to extend from 1.62 to 1.91 microns. These data are graphically shown as the discrete point in FIG. 2.

The results of threshold, output power and tunability measurements in this example demonstrate that the color center material of this present invention provides a medium for efficient, continuous lasing over an important spectral range. The absorption and emission data in FIG. 4 indicates that the material is highly efficient in lasing. In addition, the crystal has been observed to maintain its lasing capability after storage at room temperature for at least about a month.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United State is:

1. A laser material for a solid-state tunable laser which comprises an alkali halide crystal with at least one cation impurity selected from the class consisting of lithium, sodium, potassium, rubidium, cesium, calcium, strontium, and barium, said crystal having a crystalographic structure with point defects consisting essentially of $(F_2)_A$, $(F_2^+)_A$, $F_A$, $F_B$, $F_A'$, and $F_B'$ color centers in a state of dynamic equilibrium so that bleaching of $(F_2^+)_A$ centers is avoided.

2. The laser material of claim 1 wherein said alkali halide is selected from the class consisting of sodium, potassium, and rubidium chloride and fluoride.

3. The laser material of claim 2 wherein said cation impurity is selected from the class consisting of lithium, sodium and potassium and is smaller than the alkali metal of said alkali halide.

4. The laser material of claim 2 wherein alkali halide is selected from potassium chloride, potassium fluoride, and sodium fluoride.

5. The laser material of claim 1 wherein said alkali halide is an alkali iodide.

6. The laser material of claim 5 wherein said alkali halide is selected from the class consisting of sodium, potassium, and rubidium iodide.

7. The laser material of claim 6 wherein said alkali halide is selected from the class consisting of potassium and rubidium iodide.

8. A method for generating $(F_2^+)_A$ color centers in an alkali halide crystal which comprises:
additively coloring said crystal;
quenching said crystal to a temperature from about 253K to about 300K;
irradiating said crystal with light in approximately the high-energy portion of the F-center absorption band to produce, $F_A$, $F_B$, $F_2$, and $(F_2)_A$ color centers until the $F_2$ and $(F_2)_A$ concentrations are maximized;
cooling said crystal to a temperature of about 100K or less;
irradiating said crystal with light in approximately the high-energy portion of the F-center absorption band to produce $(F_2^+)_A$ color centers.

9. The method of claim 8 wherein irradiating said crystal to produce $F_A$, $F_B$, $F_2$, and $(F_2)_A$ color centers is done at a temperature from 292 to 297K.

10. The method of claim 9 wherein irradiating said crystal to produce $(F_2^+)_A$ color centers is done at a temperature from 50 to 90K.

11. In an apparatus for amplifying light by stimulated emission of radiation the improvement which comprises:
a laser medium, said laser medium being said alkali halide crystal of claim 1;
means for exposing said crystal with light in the infrared absorption band of the $(F_2^+)_A$ center of said crystal to produce a population inversion in the energy configuration of said crystal;
an optical cavity, in which said crystal is located, said cavity being capable of resonating at the fluorescence bands of $(F_2^+)_A$ centers and thus capable of stimulating the emission of coherent radiation from said color centers;
means for illuminating said crystal with light absorbed in the F-band spectral region; and
means for maintaining said crystal at 100K or lower.

12. The apparatus of claim 11 wherein said cavity has a three-mirror, astigmatically compensated configuration and said laser medium is located at the beam waist of said cavity.

13. The apparatus of claim 12 wherein said apparatus further comprises a means for tuning said emission from said color centers.

14. The apparatus of claim 13 wherein alkali halide is selected from potassium chloride, potassium fluoride, and sodium fluoride.

15. The apparatus of claim 12 wherein alkali halide is selected from potassium chloride, potassium fluoride, and sodium fluoride.

* * * * *